(12) United States Patent
Ishikawa et al.

(10) Patent No.: US 7,697,218 B2
(45) Date of Patent: Apr. 13, 2010

(54) LENS CONTROL APPARATUS, LENS BARREL, IMAGING APPARATUS, AND OPTICAL APPARATUS

(75) Inventors: Daisuke Ishikawa, Yamato (JP); Toshihiko Tomosada, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/323,320

(22) Filed: Nov. 25, 2008

(65) Prior Publication Data

US 2009/0168199 A1 Jul. 2, 2009

(30) Foreign Application Priority Data

Dec. 26, 2007 (JP) .............................. 2007-334318
Dec. 26, 2007 (JP) .............................. 2007-334320

(51) Int. Cl.
*G02B 15/14* (2006.01)
*G02B 7/02* (2006.01)

(52) U.S. Cl. ........................ 359/697; 359/694; 359/822

(58) Field of Classification Search ......... 359/694–700, 359/819–823
See application file for complete search history.

(56) References Cited

U.S. PATENT DOCUMENTS

| 5,124,738 | A | * | 6/1992 | Yamashita | ................... | 355/56 |
| 5,679,946 | A | * | 10/1997 | Mukai et al. | ............. | 250/201.2 |
| 5,895,129 | A | * | 4/1999 | Ohta | ........................... | 396/79 |
| 2002/0118966 | A1 | * | 8/2002 | Hofer et al. | ................... | 396/79 |

FOREIGN PATENT DOCUMENTS

JP 3581513 7/2004

* cited by examiner

*Primary Examiner*—Mohammed Hasan
(74) *Attorney, Agent, or Firm*—Canon USA Inc IP Div

(57) ABSTRACT

A lens control apparatus includes a temperature detection unit configured to detect a temperature near a zoom lens and a focus lens, a zoom lens drive unit configured to drive the zoom lens, and a controller configured, if it is determined that a current temperature near the zoom lens and the focus lens detected by the temperature detection unit is higher than a reference temperature, to acquire a telephoto end position to be set at the current temperature, to compare the telephoto end position with a current position of the zoom lens, and to cause the zoom lens drive unit to move the zoom lens to the telephoto end position if the current position of the zoom lens is located beyond the telephoto end position on a telephoto side.

8 Claims, 8 Drawing Sheets

LENS CONTROL APPARATUS, LENS BARREL, IMAGING APPARATUS, AND OPTICAL APPARATUS

BACKGROUND OF THE INVENTION

1. Field of the Invention

The present invention relates to a lens control apparatus configured to control the position of a zoom lens and a focus lens, to a lens barrel, to an imaging apparatus having the lens barrel and the lens control apparatus, and to an optical apparatus.

2. Description of the Related Art

Conventionally, a lens barrel for a still camera or a video camera has been widely used that drives a zoom lens and a focus lens, each including a lens unit, with a driving member, such as a stepping motor.

Generally, in the case of driving a lens unit with a driving member, such as a stepping motor, an open loop control method is often used as a control method for driving and positioning the lens unit. This is because in the open loop control method, it is not necessary to provide a detection device for detecting the current position of the lens unit. In addition, this is because in the open loop control method, the configuration of a control system can be more simplified and the size of the apparatus can be relatively small compared to a control system of the closed loop control type.

However, in the case of performing positioning control on a lens unit with the open loop control method that uses a stepping motor, it is necessary to perform control so that a drive start position of the stepping motor corresponds to a movement start position of the lens unit. Accordingly, in this case, it is required that each lens unit is provided with a reference position detection unit configured to move a lens unit back to a predetermined reference position before starting the positioning control and to determine whether the lens unit has been positioned back to the reference position (reset position).

Generally, with respect to the shape of a moving locus (a cam locus) of a focus lens, the cam locus goes along a hill-like shaped continuous curve as in the case of a cam locus at an infinite object distance. More specifically, in this case, the cam locus continues to rise from a wide-angle end to a middle position, then comes along a gentle upward curve to reach a peak at the middle position, and goes downward from the middle position to a telephoto end.

As is commonly and publicly known, the cam locus goes along a steeper curve from the middle position to the telephoto end as it approaches the telephoto end, which is characteristic to the cam locus.

Meanwhile, in recent years, in an optical apparatus such as a camera, the size of a lens barrel and the image size of a solid-state image sensor have been more and more decreased. Furthermore, a plastic material is often used as a material of a retaining member for a lens barrel and an optical system.

In this regard, it is useful to use a plastic material as a material of the retaining member for a lens barrel and an optical system because the retaining member can be easily molded with a mold. Furthermore, in this case, the shape of the retaining member can be arbitrarily selected. In addition, the manufacturing costs can be reduced compared to costs for manufacturing a retaining member made of other materials, such as a metal material.

On the other hand, in this case, a problem may arise in that the physical property and size of the retaining member made of a plastic material significantly change due to a high sensitivity to the change of temperature or moisture. In this regard, if a plastic material is used as a material of a component of a lens barrel, the focal length and/or in-focus position more significantly changes than in the case of using a metal material. In this case, the optical performance may degrade due to a phenomenon of defocusing that may arise due to the change in the focal length and in-focus position.

In order to solve the problem like this, Japanese Patent No. 3,581,513 discusses a method for correcting the position of a focus lens according to a result of calculating a defocusing amount based on the temperature change amount.

If the optical magnification is simply increased and the size of an optical system is simply reduced, then the above-described steep slope of the cam locus around the telephoto end may become more significant.

Accordingly, when the optical magnification is high, in an optical system that controls the position of a focus lens along the cam locus, if the position of the zoom lens at the telephoto end is displaced even slightly due to any particular cause, it becomes necessary to move the focus lens by an amount several tens of times as large as the amount of displacement of the position of the zoom lens at the telephoto end.

The most significant cause for such defocusing is a possible thermal expansion of the component member for a lens unit occurring due to the temperature rise. If the zoom lens moves to a position beyond the telephoto end due to the thermal expansion occurring due to the temperature rise, then it becomes necessary to move the focus lens towards an image plane (towards an image sensor, such as a charge-coupled device (CCD) or a complementary metal oxide semiconductor (CMOS)) by a distance several tens of times as great as the distance of the movement of the zoom lens beyond the telephoto end to achieve an in-focus state.

In this case, with respect to the mechanical dimension of a lens barrel, it becomes necessary to provide a clearance greater than the above-described distance of moving the focus lens to achieve an in-focus state. Accordingly, in this case, the entire mechanical length of the lens barrel may become long and the size thereof may become large.

SUMMARY OF THE INVENTION

The present invention is directed to a lens control apparatus, a lens barrel, an imaging apparatus, and an optical apparatus, which are small in size and capable of reducing a phenomenon of defocusing of a focus lens that may occur when the temperature of and around the focus lens becomes high.

According to an aspect of the present invention, a lens control apparatus includes a temperature detection unit configured to detect a temperature near a zoom lens and a focus lens, a zoom lens drive unit configured to drive the zoom lens, and a controller configured, if it is determined that a current temperature near the zoom lens and the focus lens detected by the temperature detection unit is higher than a reference temperature, to acquire a telephoto end position of the zoom lens to be set at the current temperature, to compare the telephoto end position with a current position of the zoom lens, and to cause the zoom lens drive unit to move the zoom lens to the telephoto end position if the current position of the zoom lens is located beyond the telephoto end position on a telephoto side.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to describe the principles of the present invention.

DETAILED DESCRIPTION OF THE EMBODIMENTS

Various exemplary embodiments, features, and aspects of the present invention will now be herein described in detail below with reference to the drawings. It is to be noted that the relative arrangement of the components, the numerical expressions, and numerical values set forth in these embodiments are not intended to limit the scope of the present invention.

First Exemplary Embodiment

Figure 1:
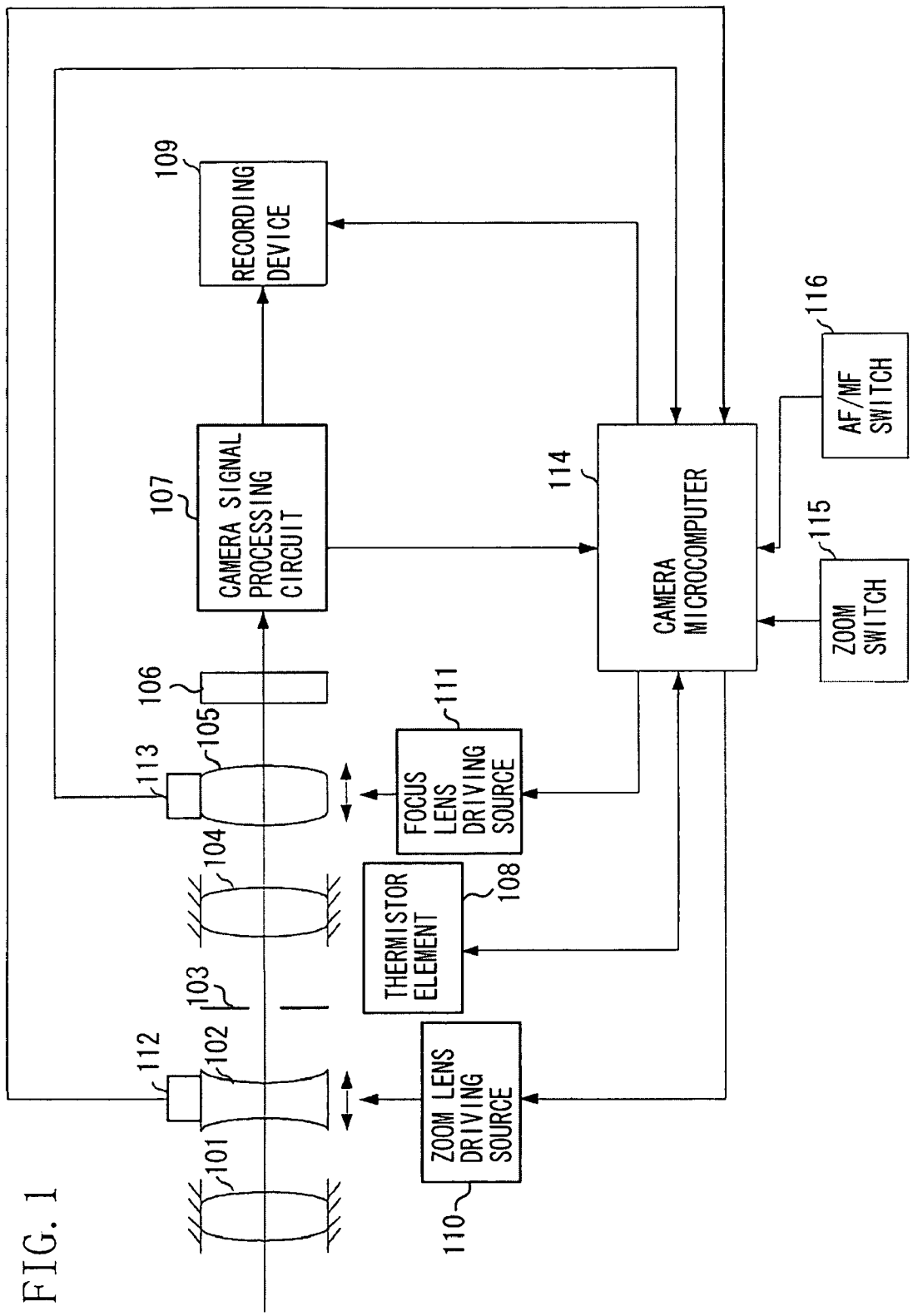
FIG. 1 illustrates an example of a system positional configuration of an imaging apparatus according to a first exemplary embodiment of the present invention.

A first exemplary embodiment of the present invention will now be described below. FIG. 1 illustrates an example of a system configuration of an imaging apparatus, such as a video camera, including a lens control apparatus according to the first exemplary embodiment of the present invention. Note that a plastic material is used as a material of a retaining member for a lens barrel and an optical system.

Referring to FIG. 1, the imaging apparatus includes a first stationary lens unit 101, a zoom lens 102, which is a lens unit for varying magnification, a diaphragm 103, and a second stationary lens unit 104. A focus lens 105 is a lens unit having a focusing function and a compensation function for compensating for the displacement of a focal plane caused by variation of magnification.

A zoom lens driving source 110 drives the zoom lens 102. A focus lens driving source 111 drives the focus lens 105. Each of the zoom lens driving source 110 and the focus lens driving source 111 includes a stepping motor and a driver unit.

An image sensor 106 is constituted by a CMOS sensor or a CCD sensor, for example. A camera signal processing circuit 107 performs signal processing for converting a signal from the image sensor 106 into a signal that can be interpreted and handled by a recording device 109. The recording device 109 records a moving image and a still image. As a recording medium, a magnetic tape, a semiconductor memory, or a digital versatile disc (DVD) can be used.

A camera microcomputer 114 controls the zoom lens driving source 110 and the focus lens driving source 111. Furthermore, the camera microcomputer 114 performs control according to a user operation of a zoom switch 115. In addition, the camera microcomputer 114 performs control for switching between an auto focus mode (AF mode) and a manual focus mode (MF mode) with respect to the mode for driving the focus lens 105 according to a state of pressing by a user of an AF/MF switch 116.

Furthermore, the camera microcomputer 114 performs control according to an output signal from the camera signal processing circuit 107. More specifically, the camera microcomputer 114 calculates a target position for the zoom lens 102 or the focus lens 105. Furthermore, the camera microcomputer 114 compares a position detected with the lens position detection unit 112 or 113, which will be described in detail later below, with the calculated target position. Moreover, the camera microcomputer 114 controls the zoom lens driving source 110 or the focus lens driving source 111 according to a result of the comparison to move the zoom lens 102 or the focus lens 105 in the direction of the optical axis.

The lens position detection unit 112 detects the position of the zoom lens 102. The lens position detection unit 113 detects the position of the focus lens 105.

Each of the lens position detection units 112 and 113 includes a photo sensor (not shown) and a light-shielding plate (not shown).

Here, the photo sensor includes a light-emitting portion and a light-receiving portion. The light-shielding plate is fixed to each of the zoom lens 102 and the focus lens 105. When the zoom lens 102 or the focus lens 105 moves in the direction of the optical axis, the light-shielding plate moves according to the movement of the zoom lens 102 or the focus lens 105.

When the light-shielding plate shields an optical path between the light-emitting portion and the light-receiving portion of the photo sensor, the level of an output signal from the light-receiving portion becomes low. On the other hand, when the light-shielding plate does not shield the optical path between the light-emitting portion and the light-receiving portion of the photo sensor, the level of an output signal from the light-receiving portion becomes high.

With the above-described configuration, the present exemplary embodiment can determine whether the zoom lens 102 or the focus lens 105 is located at a reference position. Here, the reference position refers to a position at which the output signal from the light-receiving portion changes.

The camera microcomputer 114 can recognize the position of each lens according to the reference position, a lens moving speed, and a lens moving direction.

Furthermore, the imaging apparatus includes a thermistor element 108. The thermistor element 108 detects the temperature of a portion near the lens barrel that includes therein the first stationary lens unit 101, the zoom lens 102, the diaphragm 103, the second stationary lens unit 104, and the focus lens 105. The thermistor element 108 outputs a result of the detection to the camera microcomputer 114 as temperature information.

A zoom switch 115 can be operated by the user to move the zoom lens 102 to a desired zoom position. The AF/MF switch 116 can be operated by the user to shift between the AF mode and the MF mode.

Hereinbelow, the operation from powering on the camera to setting the focus lens 105 to the initial position is referred to as a "lens reset operation".

Figure 6:
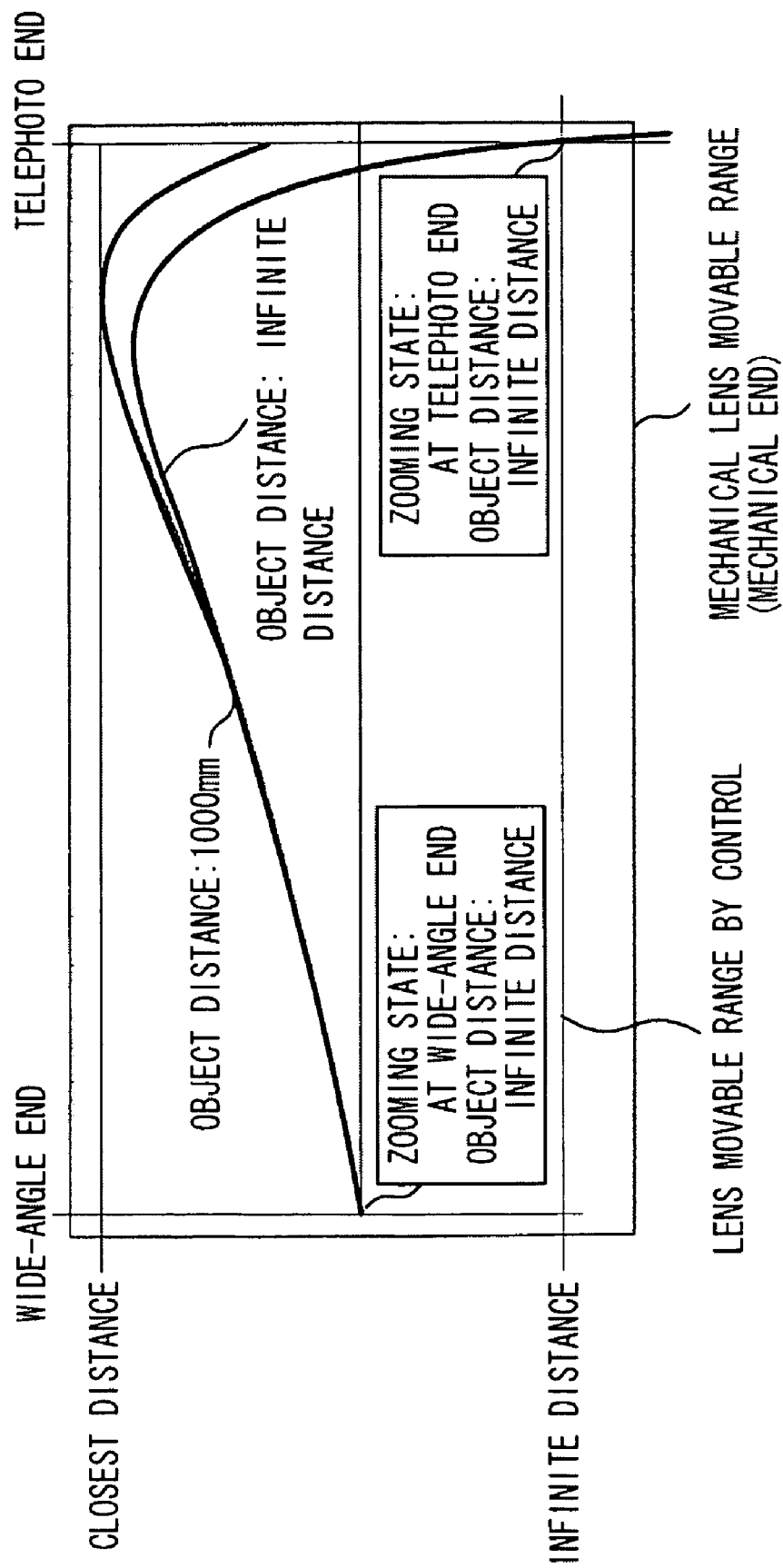
FIG. 6 illustrates an example of a cam locus of the focus lens.

FIG. 6 illustrates position control on each lens unit according to the present exemplary embodiment. In the example illustrated in FIG. 6, the horizontal axis indicates a focal length position of the zoom lens. The vertical axis indicates a position of the focus lens. More specifically, a left end portion of the horizontal axis in FIG. 6 indicates the wide-angle end, while a right end portion of the horizontal axis in FIG. 6 indicates the telephoto end. A lower end of the vertical axis indicates an infinite distance position, while an upper end of the vertical axis indicates a close distance position. In the following description, a curve illustrated in FIG. 6 is referred to as a "cam locus".

Figure 2:
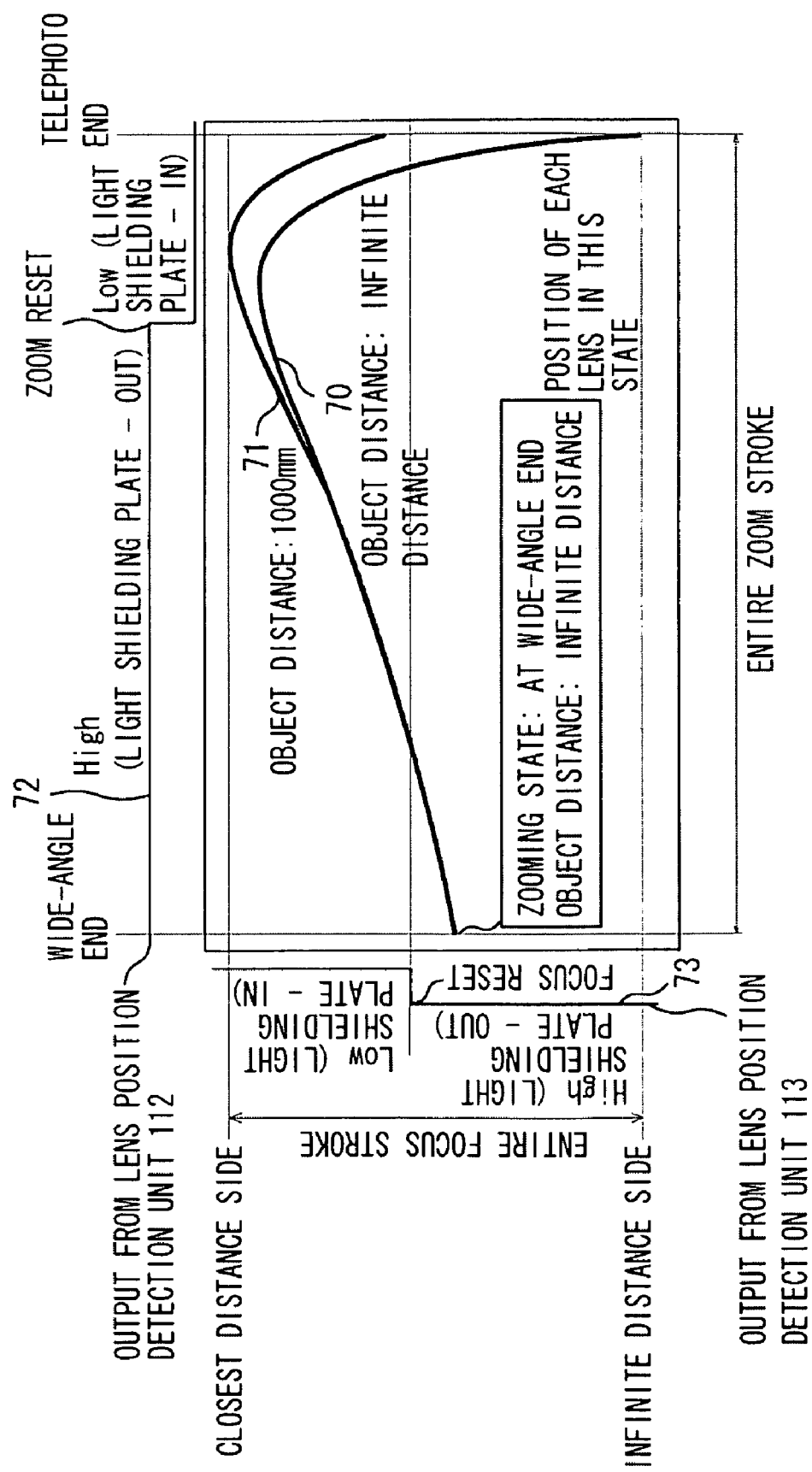
FIG. 2 illustrates a relationship among a cam locus, a zoom reset position, and a focus reset position according to the first exemplary embodiment of the present invention.

FIG. 2 illustrates positions of the zoom lens 102 and the focus lens 105 when the zoom lens 102 and the focus lens 105 are controlled (driven) along the cam locus according to the present exemplary embodiment. In the example illustrated in FIG. 2, the horizontal axis indicates a position of the zoom lens 102 between the wide-angle end to the telephoto end. A vertical axis indicates a position of the focus lens 105 between the infinite distance to the close distance.

Referring to FIG. 2, a curve 70 indicates control positions for the zoom lens 102 and the focus lens 105 at an infinite object distance. A curve 71 indicates control positions for the zoom lens 102 and the focus lens 105 in the case where the object distance is at 1,000 mm.

An output 72 from the lens position detection unit 112 is changed according to a state ("in" ("high") state or "out" ("low") state) of the light-shielding plate of the zoom lens 102. An output 73 from the lens position detection unit 113 is changed according to a state ("in" ("high") state or "out" ("low") state) of the light-shielding plate of the focus lens 105.

The position at which the state of the light-shielding plate of the zoom lens 102 or the focus lens 105 changes from the high state to the low state (the zoom reset position or the focus reset position) is used as a reference position for counting for the stepping motor that drives the zoom lens 102 or the focus lens 105.

In the present exemplary embodiment, both the zoom lens driving source 110 that drives the zoom lens 102 and the focus lens driving source 111 that drives the focus lens 105 use a stepping motor. However, it is also useful if either one of the zoom lens driving source 110 and the focus lens driving source 111 is constituted by another driving member, such as a voice coil motor (VCM), for example.

Figure 3:
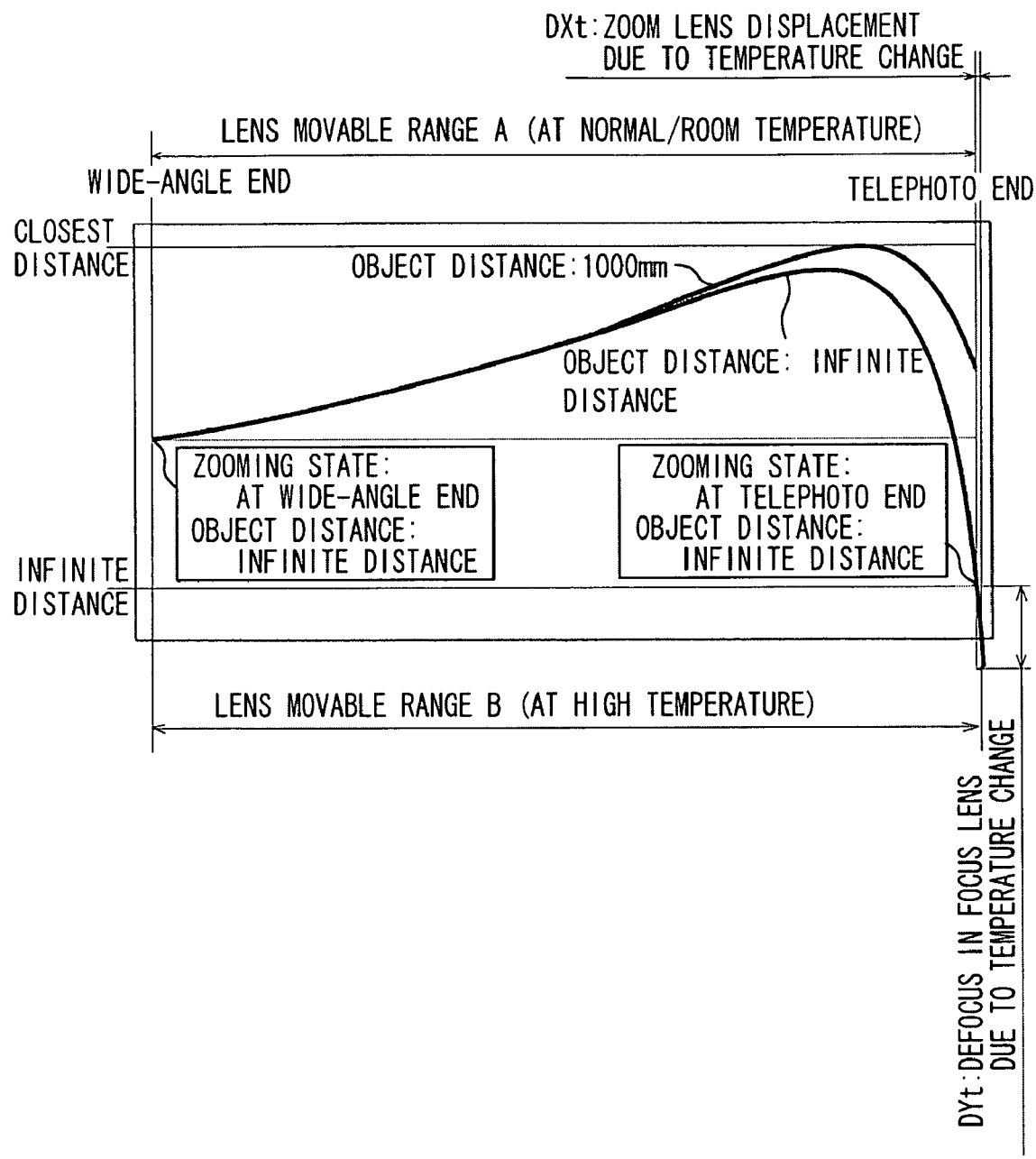
FIG. 3 illustrates a relationship between the position of a zoom lens and the position of a focus lens along the cam locus according to the first exemplary embodiment of the present invention.

Here, suppose that in the imaging apparatus including the above-described lens barrel, a power switch (not shown) has been pressed (ON) by the user and the lens reset operation has been performed, and then the temperature has risen to a high temperature. In this case, as illustrated in FIG. 3, a position of the zoom lens 102 at the telephoto end and at the infinite distance is displaced by a value equivalent to a displacement DXt (a difference between lens moveable ranges A and B) due to the temperature change.

In this case, the phenomenon of defocusing DYt occurs with respect to the focus lens 105 due to the displacement DXt. At the same time, the focal length at the telephoto end may become longer than the correct focal length.

Here, in order to correct the defocusing DYt with the focus lens 105, it is necessary to move back the focus lens 105 by an amount equivalent to the defocusing DYt.

In this regard, in order to move back the focus lens 105 to an appropriate position, it is necessary to previously provide a clearance greater than the defocusing DYt for the focus lens 105. Accordingly, in this case, the rear end portion of the lens barrel may become long. Furthermore, in this case, the clearance equivalent to or greater than the defocusing DYt may not be appropriately provided.

In order to solve these problems, it is necessary to correct the defocusing DYt. The defocusing DYt can be corrected by moving the zoom lens 102 towards the wide-angle end by an amount equivalent to the displacement DXt, instead of correcting the defocusing DYt with the focus lens 105. At the same time, the focal length at the telephoto end is set to the correct focal length.

That is, if defocusing has occurred due to a temperature change to a high temperature to or above a predetermined temperature reference value at the telephoto end and the infinite distance, it is necessary to move the position of the zoom lens 102 at the telephoto end towards the wide-angle end by an amount equivalent to the amount of the defocusing.

In order to achieve this, the present exemplary embodiment includes and uses the thermistor element 108 provided in the vicinity of the lens barrel. The thermistor element 108 is a temperature sensor for detecting whether the temperature has risen to a level equivalent to or higher than a predetermined reference temperature after the user has pressed the power switch and the lens reset operation has been completely performed.

Then, according to temperature information from the thermistor element 108, the camera microcomputer 114 moves the position of the zoom lens 102 at the telephoto end towards the wide-angle end by an amount equivalent to the displacement DXt.

That is, in the case where the temperature in the lens barrel rises exceeding a predetermined reference temperature, the camera microcomputer 114 moves the position of the zoom lens 102 at the telephoto end towards the wide-angle end via the zoom lens driving source 110 by an amount equivalent to the displacement DXt of the zoom lens 102, which has occurred due to the temperature rise. Accordingly, the zoom lens 102 can be moved to a correct focal position at the telephoto end. In addition, in this case, the defocusing DYt does not occur with respect to the focus lens 105.

Now, an operation related to the lens control with the camera microcomputer 114 will be described below with reference to the flow chart of FIG. 4.

Figure 4:
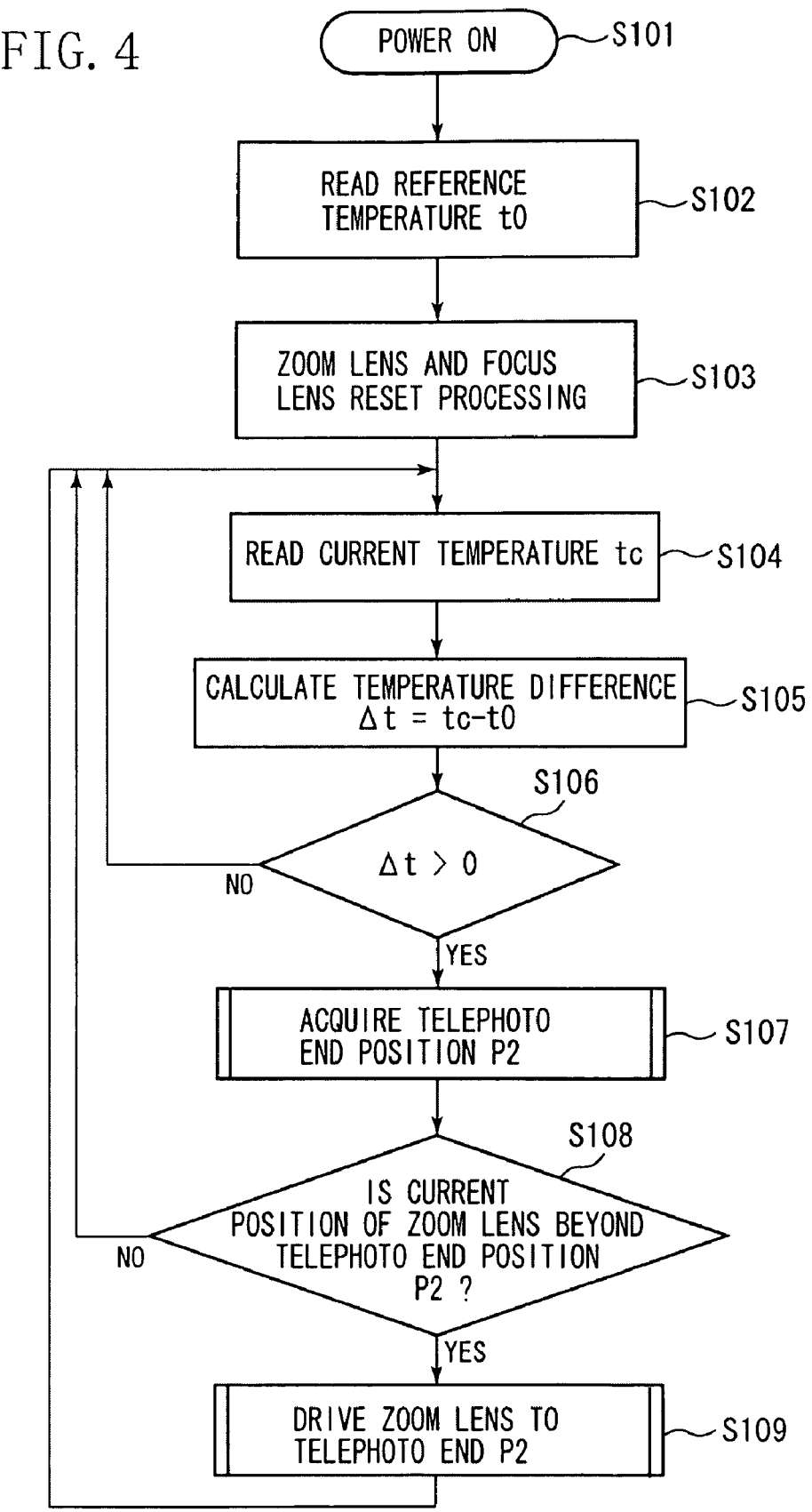
FIG. 4 is a flow chart that illustrates an example of an operation of a unit and a member related to a lens control operation performed by a camera microcomputer according to the first exemplary embodiment of the present invention.

Referring to FIG. 4, in step S101, when the user presses the power switch of the camera to power on the camera, the camera microcomputer 114 starts an operation beginning with step S102.

In step S102, the camera microcomputer 114 reads a temperature t0, which is a reference temperature. The reference temperature t0 is a temperature in the vicinity of a lens (lens vicinity temperature) at the normal room temperature. Furthermore, the reference temperature t0 is previously stored on a flash read-only memory (ROM) in the camera microcomputer 114. The reference temperature t0 is loaded on a random access memory (RAM) of the camera main body in step S102. Then, the processing advances to step S103.

In step S103, the camera microcomputer 114 performs the lens reset operation. More specifically, the camera microcomputer 114 moves the zoom lens 102 and the focus lens 105 to their initial positions. Furthermore, the camera microcomputer 114 detects a reference position of each of the zoom lens 102 and the focus lens 105.

In step S104, the camera microcomputer 114 reads the current temperature detected by the thermistor element 108 via the A/D converter. Then, the camera microcomputer 114 converts the read current temperature into the current temperature tc based on a previously stored temperature conversion table. In step S105, the camera microcomputer 114 calculates a temperature difference between the current temperature tc and the reference temperature t0 to obtain a temperature difference Δt.

In step S106, the camera microcomputer 114 determines whether the temperature difference Δt calculated in step S105 is greater than 0. That is, in step S106, the camera microcomputer 114 determines whether the current temperature tc detected in step S104 is higher than the reference temperature t0, which is the lens vicinity temperature at the normal room temperature.

If it is determined in step S106 that the temperature difference Δt is not greater than 0 (NO in step S106), then the processing returns to step S104. In step S104, the camera microcomputer 114 repeats the above-described operation.

On the other hand, if it is determined in step S106 that the temperature difference Δt is greater than 0 (YES in step S106), then the processing advance to step S107. In step S107, the camera microcomputer 114 acquires a telephoto end position P2 to be set at the current temperature tc.

Here, the telephoto end position P2 to be set at the current temperature tc can be acquired by referring to table data previously stored in a storage unit of the camera microcomputer 114. Here, the table data includes information about the relationship between the temperature in the lens barrel and the telephoto end position. In this regard, for example, the telephoto end position P2 to be set at the current temperature tc is closer to the wide-angle end than the telephoto end position P1 to be set at the reference temperature t0, as illustrated in FIG. 3.

Note that a telephoto end position difference ΔP, which is a telephoto end position difference between the telephoto end position P1 to be set at the normal room temperature (the reference temperature t0) and the telephoto end position P2 to be set at the current temperature tc, is substantially proportional to the temperature difference Δt. Accordingly, the telephoto end position difference ΔP, which is equivalent to the amount of moving the lens towards the wide-angle end, can be calculated in step S106 by the following expression:

$$\Delta P = \alpha \times \Delta t \quad (1)$$

where "α" denotes a proportionality factor. The proportionality factor α is determined uniquely to a lens barrel used for the camera.

Furthermore, the telephoto end position P2 to be set at the current temperature tc can be calculated by the following expression using the telephoto end position difference ΔP calculated by the above-described expression (1):

$$P2 = P1 - \Delta P \quad (2).$$

In step S108, the camera microcomputer 114 determines whether the current position of the zoom lens 102 is located beyond the telephoto end position P2 to be set at the current temperature tc on the telephoto side. If it is determined in step S108 that the current position of the zoom lens 102 is not located beyond the telephoto end position P2 to be set at the current temperature tc on the telephoto side (NO in step S108), then the processing returns to step S104. In step S104, the camera microcomputer 114 repeats the above-described operation.

On the other hand, if it is determined in step S108 that the current position of the zoom lens 102 is located beyond the telephoto end position P2 to be set at the current temperature tc on the telephoto side (YES in step S108), then the processing advance to step S109. In step S109, the camera microcomputer 114 drives the zoom lens 102 to the telephoto end position P2 using the zoom lens driving source 110.

The lens control apparatus of the camera (imaging apparatus) according to the present exemplary embodiment is constituted by the following components.

The camera (imaging apparatus) according to the present exemplary embodiment includes the zoom lens 102 and the focus lens 105. In addition, the imaging apparatus includes the thermistor element 108 that detects the temperature in the vicinity of the zoom lens 102 and the focus lens 105. Furthermore, the imaging apparatus includes the zoom lens driving source 110 that driving the zoom lens 102.

In addition, the imaging apparatus includes the above-described camera microcomputer 114. If it is determined that the current temperature tc, which is detected by the thermistor element 108 as described above, is higher than the reference temperature (the lens vicinity temperature at the normal room temperature) t0, then the camera microcomputer 114 acquires the telephoto end position P2 of the zoom lens 102 to be set at the current temperature tc.

After having acquired the telephoto end position P2, the camera microcomputer 114 compares a current actual position of the zoom lens 102 with the telephoto end position P2. If it is determined as a result of the comparison that the current position of the zoom lens 102 is located beyond the telephoto end position P2 on the telephoto side, then the camera microcomputer 114 causes the zoom lens driving source 110 to move the zoom lens 102 to the above-described telephoto end position P2 towards the wide-angle side.

The camera microcomputer 114 stores the table data. Here, the table data includes information about the relationship between the temperature information and the telephoto end position P2 of the zoom lens 102. The camera microcomputer 114 acquires the telephoto end position P2 of the zoom lens 102 according to the temperature information detected by the thermistor element 108 and the table data.

Furthermore, the above-described camera microcomputer 114 calculates the temperature difference (a high temperature above a predetermined temperature value) Δt between the reference temperature and the current temperature tc detected by the thermistor element 108. Furthermore, the camera microcomputer 114 calculates the telephoto end position P2 of the zoom lens 102 using the temperature difference Δt and a predetermined calculation coefficient (i.e., using the above-described expressions (1) and (2)).

With the above-described configuration, the zoom lens 102 is moved to a correct telephoto end position. In addition, in the present exemplary embodiment, an appropriate clearance for the lens barrel can be secured when the focus lens 105 is located at the in-focus position at an infinite distance. Accordingly, the entire mechanical length of the lens barrel can be sufficiently reduced.

That is, according to the present exemplary embodiment, it is not necessary to move the focus lens 105 for focusing even when the lens vicinity temperature has risen to a temperature higher than the reference temperature. Thus, the size of the lens barrel according to the present exemplary embodiment can be sufficiently reduced.

Furthermore, according to the present exemplary embodiment having the above-described configuration, if the lens vicinity temperature has risen, it can be prevented that the actual focal length exceeds a predetermined setting value due to a thermal expansion of the lens barrel. That is, the present exemplary embodiment can implement a small-sized imaging apparatus in which the defocusing of the focus lens 105 due to high temperature is reduced.

Second Exemplary Embodiment

A second exemplary embodiment of the present invention will be described below. In the case where a stepping motor is used to drive the zoom lens 102, the zoom lens 102 cannot always be stopped at a desired zoom lens position due to hysteresis or a stopping accuracy (the resolution of the stepping motor) for stopping the zoom lens 102.

In particular, in the vicinity of the telephoto end position, in which the moving amount for moving the focus lens 105 is larger than the moving amount for moving the zoom lens 102, the focus lens 105 may be defocused. In this case, a phenomenon of small blur may occur in the captured image. In this regard, the present exemplary embodiment can immediately drive the focus lens 105 to an in-focus position in the case of the AF mode even if a phenomenon of small blur has occurred due to the above-described causes. However, in the case of the MF mode, the above-described problem cannot be easily solved. In the second exemplary embodiment of the present invention, a method for solving the above-described problems in both the AF mode and the MF mode of the imaging apparatus is described.

In the second exemplary embodiment, the configuration of the imaging apparatus is similar to that illustrated in FIG. 1. In this regard, only the content of processing performed by the camera microcomputer 114 in the present exemplary embodiment is different from that in the first exemplary embodiment. Now, the content of the processing performed by the camera microcomputer 114 will be described in detail below with reference to the flow chart of FIG. 5.

Figure 5:
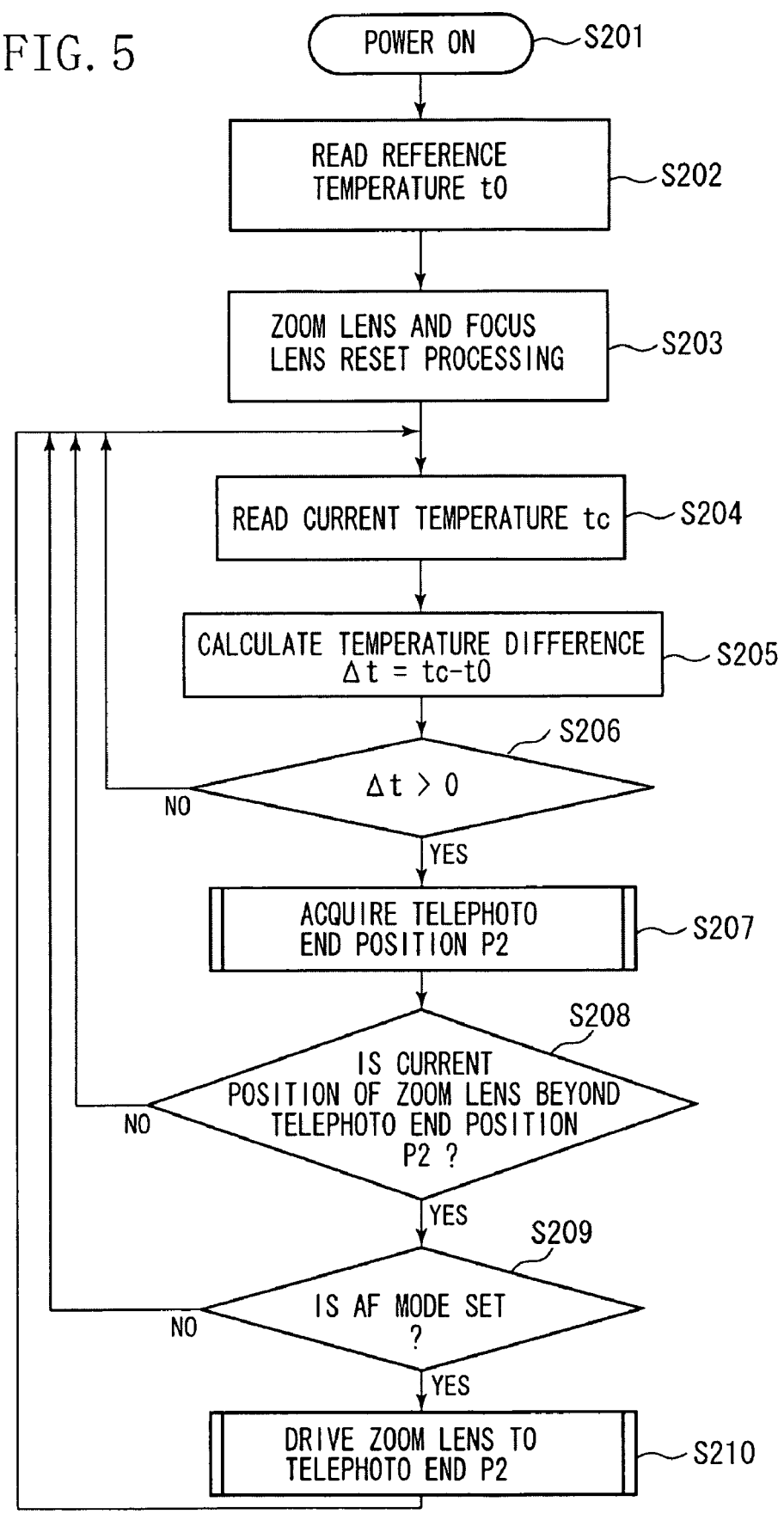
FIG. 5 is a flow chart that illustrates an example of an operation of a unit and a member related to a lens control operation performed by a camera microcomputer according to a second exemplary embodiment of the present invention.

Referring to FIG. 5, in step S201, when the user presses the power switch of the camera to power on the camera, the camera microcomputer 114 starts an operation beginning with step S201.

In step S202, the camera microcomputer 114 reads a temperature t0, which is a reference temperature. The reference temperature t0 is a lens vicinity temperature at the normal room temperature. Furthermore, the reference temperature to is previously stored on a flash ROM in the camera microcomputer 114. The reference temperature t0 is loaded on a RAM of the camera main body in step S202. Then, the processing advances to step S203.

In step S203, the camera microcomputer 114 performs the lens reset operation. More specifically, the camera microcomputer 114 moves the zoom lens 102 and the focus lens 105 to their initial positions, as in the first exemplary embodiment. Furthermore, the camera microcomputer 114 detects a reference position of each of the zoom lens 102 and the focus lens 105.

In step S204, the camera microcomputer 114 reads the current temperature detected by the thermistor element 108 via the A/D converter. Then, the camera microcomputer 114 converts the read current temperature into the current temperature tc based on a previously stored temperature conversion table.

In step S205, the camera microcomputer 114 calculates a temperature difference between the current temperature tc and the reference temperature t0 to obtain a temperature difference Δt.

In step S206, the camera microcomputer 114 determines whether the temperature difference Δt calculated in step S205 is greater than 0.

That is, in step S206, the camera microcomputer 114 determines whether the current temperature tc detected in step S204 is higher than the reference temperature t0, which is the lens vicinity temperature at the normal room temperature. If it is determined in step S206 that the temperature difference Δt is not greater than 0 (NO in step S206), then the processing returns to step S204. In step S204, the camera microcomputer 114 repeats the above-described operation.

On the other hand, if it is determined in step S206 that the temperature difference Δt is greater than 0 (YES in step S206), then the processing advance to step S207. In step S207, the camera microcomputer 114 acquires a telephoto end position P2 to be set at the current temperature tc.

Here, the telephoto end position P2 to be set at the current temperature tc can be acquired by referring to table data previously stored in a storage unit of the camera microcomputer 114. Here, the table data includes information about the relationship between the temperature in the lens barrel and the telephoto end position. In this regard, for example, the telephoto end position P2 to be set at the current temperature tc is closer to the wide-angle end than the telephoto end position P1 to be set at the reference temperature t0, as illustrated in FIG. 3, as in the first exemplary embodiment.

Note that a telephoto end position difference ΔP, which is a telephoto end position difference between the telephoto end position P1 to be set at the normal room temperature (the reference temperature t0) and the telephoto end position P2 to be set at the current temperature tc, is substantially proportional to the temperature difference Δt. Accordingly, the telephoto end position difference ΔP, which is equivalent to the amount of moving the lens towards the wide-angle end, can be calculated in step S207 by the following expression:

$$\Delta P = \alpha \times \Delta t \tag{1}$$

where "α" denotes a proportionality factor. The proportionality factor α is determined uniquely to a lens barrel used for the camera.

Furthermore, the telephoto end position P2 to be set at the current temperature tc can be calculated by the following expression using the telephoto end position difference ΔP calculated by the above-described expression (1):

$$P2 = P1 - \Delta P \tag{2}$$

In step S208, the camera microcomputer 114 determines whether the current position of the zoom lens 102 is located beyond the telephoto end position P2 to be set at the current temperature tc on the telephoto side. If it is determined in step S208 that the current position of the zoom lens 102 is not located beyond the telephoto end position P2 to be set at the current temperature tc on the telephoto side (NO in step S208), then the processing returns to step S204. In step S204, the camera microcomputer 114 repeats the above-described operation.

On the other hand, if it is determined in step S208 that the current position of the zoom lens 102 is located beyond the telephoto end position P2 to be set at the current temperature tc on the telephoto side (YES in step S208), then the processing advance to step S209. In step S209, the camera microcomputer 114 determines whether the user has set the AF mode for the focus mode.

If it is determined in step S209 that the user has not set the AF mode for the focus mode (that the MF mode has been set for the focus mode) (NO in step S209), then the processing returns to step S204. In step S204, the camera microcomputer 114 repeats the above-described operation.

On the other hand, if it is determined in step S209 that the user has set the AF mode for the focus mode (YES in step S209), then the processing advances to step S210. In step S210, the camera microcomputer 114 drives the zoom lens 102 to the telephoto end position P2 using the zoom lens driving source 110.

In the present exemplary embodiment, if the AF mode has been set for the drive mode for driving the focus lens 105, the camera microcomputer 114 performs the operation similar to that in the first exemplary embodiment.

However, in the case where the MF mode has been set, the focus lens 105 may be defocused particularly in the vicinity of the telephoto end position, in which the moving amount for moving the focus lens 105 is larger than the moving amount for moving the zoom lens 102. In this case, a phenomenon of small blur may occur in the captured image.

In order to address this, the present exemplary embodiment inhibits moving of the zoom lens 102 to the telephoto end position P2 using the zoom lens driving source 110 even in the case where the zoom lens 102 is positioned at a position beyond the telephoto end position P2 on the telephoto side.

The present exemplary embodiment is configured so as to inhibit moving of the zoom lens 102 to the telephoto end position P2 using the zoom lens driving source 110 in the MF mode in order to prevent the following problem. That is, in the vicinity of the telephoto end, the moving amount for moving the focus lens 105 is greater than the moving amount for moving the zoom lens 102. Accordingly, in this case, variations in the optical performance of the zoom lens 102 and the focus lens 105 and the defocusing that may occur with respect to the focus lens 105 significantly affect the optical performance of the entire imaging apparatus. That is, in this case, an appropriate focal position may not be stored even if the focus lens 105 is driven according to setting values.

On the other hand, if the AF mode has been set by the user, an appropriate focal position can be stored because the present exemplary embodiment can immediately drive the focus lens 105 to an in-focus position even if a phenomenon of small blur has occurred due to the above-described causes.

According to the present exemplary embodiment having the above-described configuration, it is prevented that the zoom lens 102 cannot be driven to a desired focal position due to the hysteresis or the stopping accuracy (the resolution of the stepping motor) for stopping the zoom lens 102. Accordingly, the phenomenon of small blur that may occur during a photographing operation can be prevented.

Third Exemplary Embodiment

Figure 7:
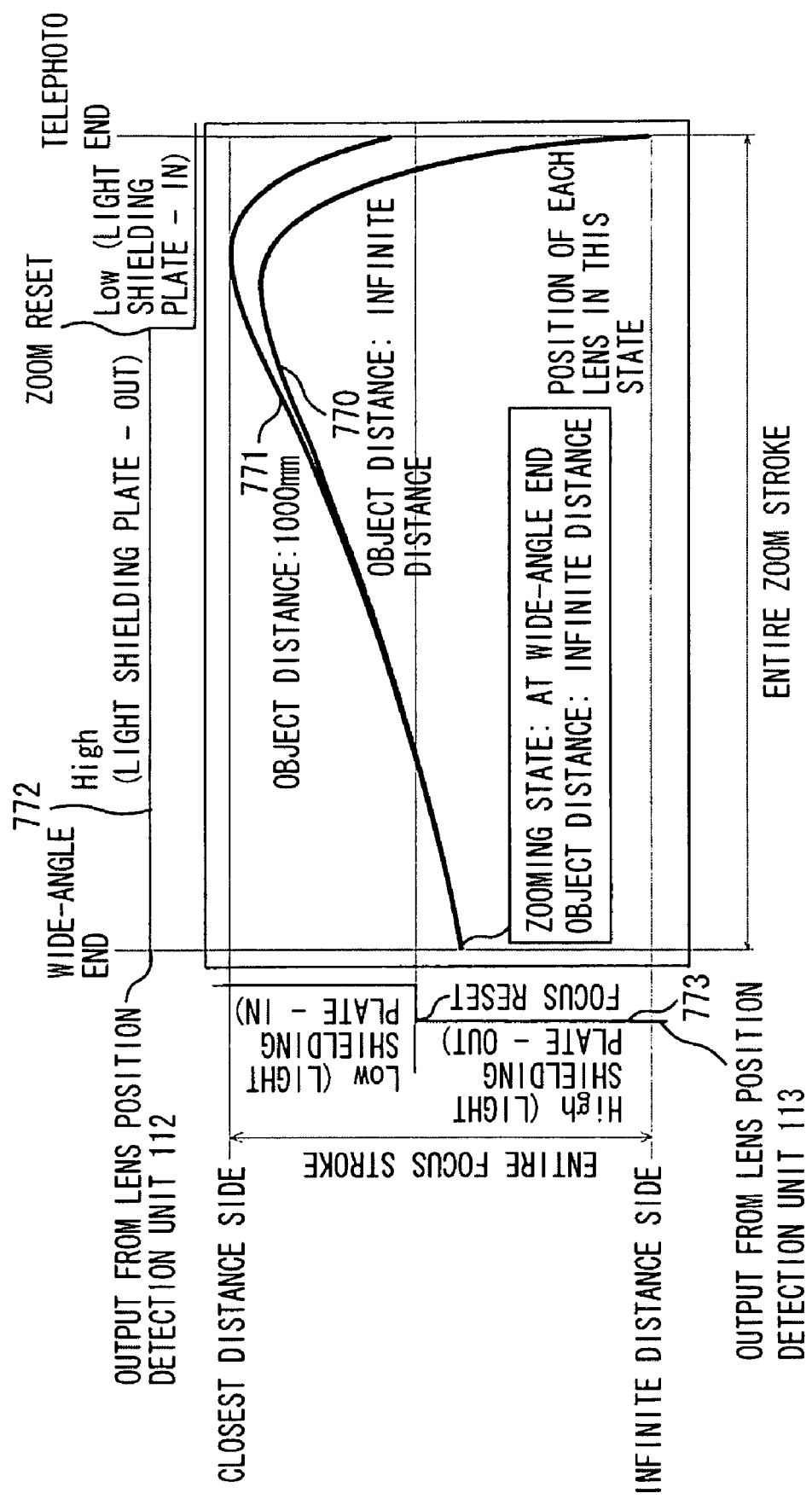
FIG. 7 illustrates a relationship among a cam locus, a zoom reset position, and a focus reset position according to a third exemplary embodiment of the present invention.

A third exemplary embodiment of the present invention will be described below. FIG. 7 illustrates an exemplary position of each of the zoom lens 102 and the focus lens 105 when the zoom lens 102 and the focus lens 105 are controlled along the cam locus. In the example illustrated in FIG. 7, the horizontal axis indicates a position of the zoom lens 102 between the wide-angle end and the telephoto end. The vertical axis indicates a position of the focus lens 105 between the infinite distance and the close distance.

Referring to FIG. 7, a curve 770 indicates control positions for the zoom lens 102 and the focus lens 105 at an infinite object distance. A curve 771 indicates control positions for the zoom lens 102 and the focus lens 105 in the case where the object distance is at 1,000 mm.

An output 772 from the lens position detection unit 112 is changed according to a state ("in" ("high") state or "out" ("low") state) of a light-shielding plate (not illustrated) of the zoom lens 102. An output 773 from the lens position detection unit 113 is changed according to a state ("in" ("high") state or "out" ("low") state) of a light-shielding plate (not illustrated) of the focus lens 105.

The position at which the state of the zoom lens 102 or the focus lens 105 changes from the high state to the low state (the zoom reset position or the focus reset position) is used as a reference position for counting for the stepping motor that drives the zoom lens 102 or the focus lens 105.

In the present exemplary embodiment, both the zoom lens driving source 110 that drives the zoom lens 102 and the focus lens driving source 111 that drives the focus lens 105 use a stepping motor. However, it is also useful if either one of the zoom lens driving source 110 and the focus lens driving source 111 is constituted by another driving member, such as a VCM, for example.

Here, suppose that in the imaging apparatus including the above-described lens barrel, the power switch (not shown) has been pressed (ON) by the user and the lens reset operation has been performed, and then the temperature has risen to a high temperature. In this case, as illustrated in FIG. 3, a position of the zoom lens 102 at the telephoto end and at the infinite distance is displaced by a value equivalent to a displacement DXt (a difference between lens moveable ranges A and B) due to the temperature change.

In this case, the phenomenon of defocusing DYt occurs with respect to the focus lens 105 due to the displacement DXt. In this case, in order to secure a clearance equal to or greater than the defocusing DYt, the present exemplary embodiment moves the zoom lens 102 positioned at the telephoto end towards the wide-angle end by an amount equivalent to the displacement DXt. Furthermore, the focus lens 105 performs the focus adjustment operation.

Here, it is supposed that in the present exemplary embodiment, in the case where the lens vicinity temperature has dropped from a high temperature above the reference temperature to a low temperature below the reference temperature, the position of the zoom lens 102 at the telephoto end is driven towards the telephoto end by an amount equivalent to the displacement DXt. In this case, the zoom lens 102, which has been positioned at the telephoto end and an infinite distance position before the temperature drops, is slightly displaced from the telephoto end position towards the wide-angle end. Accordingly, if the user operates the zoom switch 115 to adjust the position of the zoom lens 102 towards the telephoto end, the zoom lens 102 can be displaced to a position beyond the telephoto end position P2, which is an appropriate position of the zoom lens 102 on the telephoto side.

Furthermore, in particular processing performed by determining whether the zoom lens 102 is positioned at the appropriate telephoto end position, that is, in processing for switching from optical zooming to electronic zooming, if the position of the zoom lens 102 at the telephoto end is displaced, the determination cannot be correctly performed. In this case, the electronic zooming mode be cancelled.

In order to solve the above-described problem, the present exemplary embodiment does not change the position of the zoom lens 102 at the telephoto end if the zoom lens 102 is positioned at the telephoto end when the lens vicinity temperature has dropped from a high temperature above the reference temperature to a low temperature below the reference temperature. Accordingly, the present exemplary embodiment can prevent the above-described problem that may occur when the zoom lens 102 is positioned at the telephoto end.

Note that if the zoom lens 102 is positioned at a position close to the wide-angle end, not at the telephoto end position, the above-described problem may not occur. Accordingly, it is useful if the position of the zoom lens 102 at the telephoto end is changed to a position of the zoom lens 102 at a low temperature.

Now, an operation related to the lens control with the camera microcomputer 114 will be described below with reference to the flow chart of FIG. 8.

Figure 8:
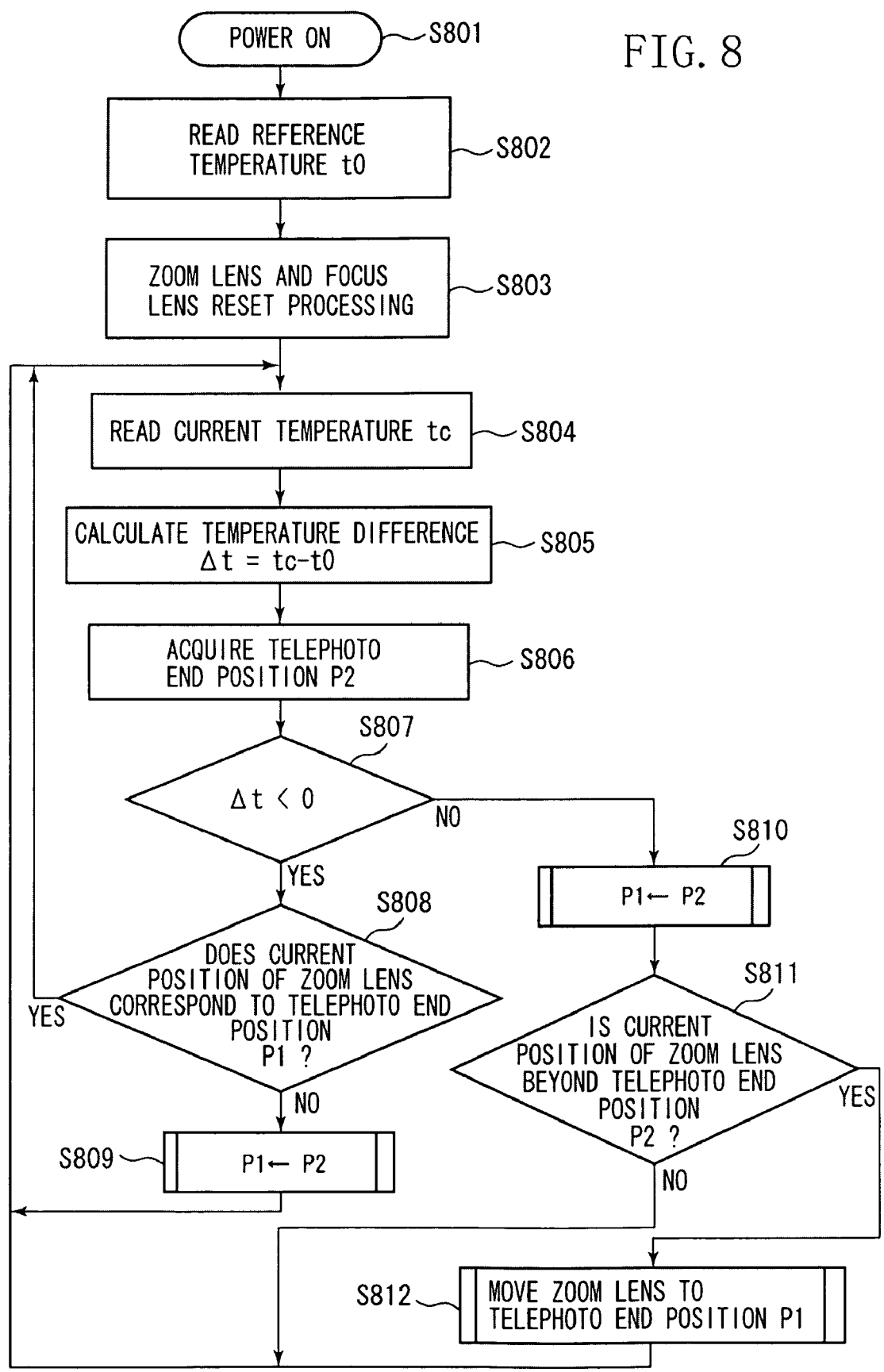
FIG. 8 illustrates an operation of a unit and a member related to a lens control operation performed by a camera microcomputer according to the third exemplary embodiment of the present invention.

Referring to FIG. 8, in step S801, when the user presses the power switch of the camera to power on the camera, the camera microcomputer 114 starts an operation beginning with step S802.

In step S802, the camera microcomputer 114 reads a temperature t0, which is a reference temperature. The reference temperature t0 is a lens vicinity temperature at the normal room temperature. Furthermore, the reference temperature t0 is previously stored on a flash ROM in the camera microcomputer 114. The reference temperature t0 is loaded on a RAM of the camera main body in step S802. Then, the processing advances to step S803.

In step S803, the camera microcomputer 114 performs the lens reset operation. More specifically, the camera microcomputer 114 moves the zoom lens 102 and the focus lens 105 to their initial positions. Furthermore, the camera microcomputer 114 detects a reference position of each of the zoom lens 102 and the focus lens 105.

In step S804, the camera microcomputer 114 reads the current temperature detected by the thermistor element 108 via the A/D converter. Then, the camera microcomputer 114 converts the read current temperature into the current temperature tc based on a previously stored temperature conversion table.

In step S805, the camera microcomputer 114 calculates a temperature difference between the current temperature tc and the reference temperature t0 to obtain a temperature difference Δt.

In step S806, the camera microcomputer 114 acquires the telephoto end position P2 to be set at the current temperature tc.

Here, for example, the telephoto end position P2 to be set at the current temperature tc can be acquired by referring to table data which indicates the relationship between the temperature information and the telephoto end position stored previously by the storage unit of the camera microcomputer 114.

Note that a telephoto end position difference ΔP, which is a telephoto end position difference between the telephoto end position P1 to be set at the normal room temperature (the reference temperature t0) and the telephoto end position P2 to be set at the current temperature tc, is substantially proportional to the temperature difference Δt. Accordingly, the telephoto end position difference ΔP, which is equivalent to the amount of moving the lens towards the wide-angle end, can be calculated in step S806 by the following expression:

$$\Delta P = \alpha \times \Delta t \quad (1)$$

where "α" denotes a proportionality factor. The proportionality factor α is determined uniquely to a lens barrel used for the camera.

Furthermore, the telephoto end position P2 to be set at the current temperature tc can be calculated by the following expression using the telephoto end position difference ΔP calculated by the above-described expression (1):

$$P2 = P1 - \Delta P \quad (2).$$

In step S807, the camera microcomputer 114 determines whether the temperature difference Δt obtained in step S805 is less than 0. More specifically, in step S807, the camera microcomputer 114 determines whether the current temperature tc detected in step S804 is lower than the reference temperature t0, which is the lens vicinity temperature at the normal room temperature.

If it is determined in step S807 that the temperature difference Δt is not less than 0 (not lower than the reference temperature t0) (NO in step S807), then the processing advances to step S810. In step S810, the camera microcomputer 114 changes the telephoto end position P1 to the telephoto end position P2 to be set at the current temperature tc (P1←P2). Then, the processing advances to step S811.

In step S811, the camera microcomputer 114 determines whether the current position of the zoom lens 102 is located beyond the telephoto end position P2 to be set at the current temperature tc on the telephoto side. If it is determined in step S811 that the current position of the zoom lens 102 is located beyond the telephoto end position P2 to be set at the current temperature tc on the telephoto side (YES in step S811), then the processing advances to step S812. In step S812, the camera microcomputer 114 moves the zoom lens 102 to the telephoto end position P1 (=the telephoto end position P2), which has been changed in step S810.

With the above-described configuration, the present exemplary embodiment can prevent the zoom lens 102 from being displaced beyond an appropriate telephoto end position. Accordingly, the present exemplary embodiment can secure a sufficient clearance with respect to the mechanical dimension of the lens barrel.

On the other hand, if it is determined in step S811 that the current position of the zoom lens 102 is not located beyond the telephoto end position P2 to be set at the current temperature tc on the telephoto side (NO in step S811), then the processing return step S804. In step S804, the camera microcomputer 114 repeats the above-described operation.

On the other hand, if it is determined in step S807 that the temperature difference Δt is less than 0 (lower than the reference temperature t0) (YES in step S807), then the processing advances to step S808. In step S808, the camera microcomputer 114 determines whether the current position of the zoom lens 102 corresponds to the current telephoto end position P1.

If it is determined in step S808 that the current position of the zoom lens 102 corresponds to the current telephoto end position P1 (YES in step S808), then the camera microcomputer 114 returns to step S804 without changing the telephoto end position. In step S804, the camera microcomputer 114 repeats the above-described operation.

On the other hand, if it is determined in step S808 that the current position of the zoom lens 102 does not correspond to the current telephoto end position P1 (NO in step S808), then the processing advances to step S809. In step S809, the camera microcomputer 114 changes the telephoto end position P1 to the telephoto end position P2 to be set at the current temperature tc (P1→P2).

That is, in the present exemplary embodiment, it is inhibited to change the telephoto end position of the zoom lens 102 even if the lens vicinity temperature has dropped to a temperature lower than the predetermined reference temperature when the zoom lens 102 is positioned at the telephoto end position P1.

The present exemplary embodiment inhibits changing the telephoto end position of the zoom lens 102 for the following reason. That is, if the lens vicinity temperature drops to a temperature lower than the predetermined reference temperature after once rising to a high temperature above a temperature higher than the predetermined reference temperature and the zoom lens 102 is moved towards the wide-angle end from its telephoto end position, an appropriate movable range of the zoom lens 102 is restored. In this case, it is necessary to reset the telephoto end position of the zoom lens 102, which has been once changed to a position close to the wide-angle end, to a position close to the telephoto end.

In the case where the zoom lens 102 is positioned at the telephoto end, the above-described problem may arise if the telephoto end position is reset to an appropriate position. Accordingly, it is inhibited to change the telephoto end position in this case. On the other hand, except for this case, the present exemplary embodiment changes the telephoto end position of the zoom lens 102 to a position close to the telephoto end.

According to the present exemplary embodiment having the above-described configuration, the current actual position of the zoom lens 102 can accurately correspond to a current position of the zoom lens 102 displayed to the user. In addition, according to the present exemplary embodiment having the above-described configuration, the above-described problem can be reduced that may occur during particular processing performed when the zoom lens 102 is positioned at the telephoto end position (processing for switching to the electronic zooming mode).

On the other hand, in the present exemplary embodiment, when the zoom lens 102 is moved towards the wide-angle end according to the user operation of the zoom switch 115 and thus the zoom lens 102 is not positioned at the telephoto end position P2, the camera microcomputer 114 performs control so that the telephoto end position of the zoom lens 102 is changed from the telephoto end position P2 to the telephoto end position P1.

The imaging apparatus according to each of the above-described exemplary embodiments includes the thermistor element 108 that detects the temperature in the vicinity of the zoom lens 102 and the focus lens 105. Furthermore, if the telephoto end position of the zoom lens 102 at the reference temperature t0 is positioned at the telephoto end position P1 and if the current lens vicinity temperature is at the current temperature tc, which is higher than the reference temperature t0, the camera microcomputer 114 changes the telephoto end position of the zoom lens 102 to the telephoto end position P2.

The camera microcomputer 114, on the other hand, inhibits changing the telephoto end position of the zoom lens 102 to the telephoto end position P1 if the current position of the zoom lens 102 corresponds to the telephoto end position P2.

With the above-described configuration, the present exemplary embodiment can prevent the user from performing zooming to a position beyond the telephoto end position on the telephoto side. In addition, according to the present exemplary embodiment having the above-described configuration, the current actual position of the zoom lens 102 can accurately correspond to a current position of the zoom lens 102 displayed to the user. Furthermore, according to the present exemplary embodiment having the above-described configuration, the above-described problem can be reduced that may occur during particular processing performed when the zoom lens 102 is positioned at the telephoto end position (processing for switching to the electronic zooming mode).

In the above description, the present invention is applied to an imaging apparatus. However, the present invention is not limited to this. That is, the present invention can be applied to a lens control apparatus. Furthermore, the present invention can be applied to an optical apparatus, such as binoculars, including the above-described lens control apparatus.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2007-334320 filed Dec. 26, 2007 and Japanese Patent Application No. 2007-334318 filed Dec. 26, 2007, which are hereby incorporated by reference herein in their entirety.

What is claimed is:

1. A lens control apparatus comprising:
   a temperature detection unit configured to detect a temperature near a zoom lens and a focus lens;
   a zoom lens drive unit configured to drive the zoom lens; and
   a controller configured, if it is determined that a current temperature near the zoom lens and the focus lens detected by the temperature detection unit is higher than a reference temperature, to acquire a telephoto end position of the zoom lens to be set at the current temperature, to compare the telephoto end position with a current position of the zoom lens, and to cause the zoom lens drive unit to move the zoom lens to the telephoto end position if the current position of the zoom lens is located beyond the telephoto end position on a telephoto side, to provide focus correction without moving the focus lens.

2. The lens control apparatus according to claim 1, further comprising a storage unit configured to store table data indicating a relationship between the temperature near the zoom lens and the focus lens and the telephoto end position of the zoom lens,
   wherein the controller is configured to acquire the telephoto end position of the zoom lens according to the temperature detected by the temperature detection unit based on the table data.

3. The lens control apparatus according to claim 1, wherein the controller is configured to calculate a temperature difference between the reference temperature and the temperature detected by the temperature detection unit and to acquire the telephoto end position of the zoom lens by performing calculation using the temperature difference.

4. The lens control apparatus according to claim 1, wherein the controller is configured to inhibit the zoom lens drive unit from moving the zoom lens to the telephoto end position even if the current position of the zoom lens is located beyond the telephoto end position on the telephoto side in a case where a mode for driving the focus lens is a manual focus mode instead of an auto focus mode.

5. A lens control apparatus comprising:
   a temperature detection unit configured to detect a temperature near a zoom lens and a focus lens;
   a zoom lens drive unit configured to drive the zoom lens; and
   a controller configured, if it is determined that a current temperature near the zoom lens and the focus lens detected by the temperature detection unit is a high temperature higher than a reference temperature, to acquire a telephoto end position of the zoom lens to be set at the high temperature, to compare the telephoto end position with a current position of the zoom lens, and to cause the zoom lens drive unit to move the zoom lens to the telephoto end position if the current position of the zoom lens is located beyond the telephoto end position on a telephoto side, wherein, if it is determined that the current temperature near the zoom lens and the focus lens detected by the temperature detection unit has become a low temperature lower than the reference temperature when the telephoto end position of the zoom lens has been changed to the telephoto end position to be set at the high temperature, the controller is configured to inhibit changing the telephoto end position of the zoom lens to a telephoto end position to be set at the low temperature if it is determined that the current position of the zoom lens corresponds to the telephoto end position to be set at the high temperature.

6. The lens control apparatus according to claim 5, wherein, if it is determined that the current temperature near the zoom lens and the focus lens detected by the temperature detection unit has become the low temperature lower than the reference temperature when the telephoto end position of the zoom lens has been changed to the telephoto end position to be set at the high temperature, the controller is configured to change the telephoto end position of the zoom lens to the telephoto end position to be set at the low temperature if it is determined that the current position of the zoom lens does not correspond to the telephoto end position to be set at the high temperature.

7. The lens control apparatus according to claim 5, further comprising a storage unit configured to store table data indicating a relationship between the temperature near the zoom lens and the focus lens and the telephoto end position of the zoom lens, wherein the controller is configured to acquire the telephoto end position of the zoom lens according to the temperature detected by the temperature detection unit based on the table data.

8. The lens control apparatus according to claim 5, wherein the controller is configured to calculate a temperature difference between the reference temperature and the temperature detected by the temperature detection unit and to acquire the telephoto end position of the zoom lens by performing calculation using the temperature difference.

* * * * *